United States Patent
Chen et al.

(10) Patent No.: US 12,298,254 B2
(45) Date of Patent: May 13, 2025

(54) SYSTEM AND METHOD FOR REDUCING SAMPLE NOISE USING SELECTIVE MARKERS

(71) Applicant: KLA Corporation, Milpitas, CA (US)

(72) Inventors: Grace Hsiu-Ling Chen, Los Gatos, CA (US); Kuljit S. Virk, Fremont, CA (US); Martin Gruebele, Champaign, IL (US)

(73) Assignee: KLA Corporation, Milpitas, CA (US)

( * ) Notice: Subject to any disclaimer, the term of this patent is extended or adjusted under 35 U.S.C. 154(b) by 218 days.

(21) Appl. No.: 18/139,637

(22) Filed: Apr. 26, 2023

(65) Prior Publication Data

US 2023/0408422 A1    Dec. 21, 2023

Related U.S. Application Data

(60) Provisional application No. 63/352,708, filed on Jun. 16, 2022.

(51) Int. Cl.
  *G01N 21/93*  (2006.01)
  *G01N 21/91*  (2006.01)

(52) U.S. Cl.
  CPC ............. *G01N 21/93* (2013.01); *G01N 21/91* (2013.01); *G01N 2201/0636* (2013.01)

(58) Field of Classification Search
  CPC .................. G01N 21/93; G01N 21/91; G01N 2201/0636; G01N 2021/8438; G01N 21/8422; G01N 21/9501
  See application file for complete search history.

(56) References Cited

U.S. PATENT DOCUMENTS

| | | |
|---|---|---|
| 4,302,108 A | 11/1981 | Timson |
| 7,102,737 B2 | 9/2006 | Eyolfson et al. |

(Continued)

FOREIGN PATENT DOCUMENTS

| | | |
|---|---|---|
| JP | H0536795 A | 2/1993 |
| JP | 5471233 B2 | 4/2014 |
| WO | 8601914 A1 | 3/1986 |

OTHER PUBLICATIONS

Choi et al "Overcoming metal-induced fluorescence quenching on plasmo-photonic metasurfaces coated by a self-assembled monolayer" Chem. Commun. 2015, 51, 11470.

(Continued)

*Primary Examiner* — Thanh Luu
*Assistant Examiner* — Mai Thi Ngoc Tran
(74) *Attorney, Agent, or Firm* — Suiter Swantz IP

(57) ABSTRACT

An inspection is disclosed. The system may include an illumination source configured to illuminate a sample. The sample may include a multi-layer stack including a plurality of layers formed of a first material and at least a second material. The first material may include a light transmissive material and the second material may include light reflective material. A top layer within the stack may include absorptive markers configured to selectively bind to the top layer. The absorptive markers may be configured block light transmission through layers positioned below the top layer. The top layer may include photoluminescent markers configured to selectively bind to the light reflective material to enhance a feature of interest on the sample. The system may include detectors configured to detect photoluminescent emission emitted by the photoluminescent markers and optical elements may be configured to direct the photoluminescent emission to the detectors.

16 Claims, 6 Drawing Sheets

(56) References Cited

U.S. PATENT DOCUMENTS

| | | | |
|---|---|---|---|
| 7,179,568 | B2 | 2/2007 | Cerrina et al. |
| 9,970,873 | B1* | 5/2018 | Pettibone ............ G01N 21/9501 |
| 2007/0054195 | A1 | 3/2007 | Usami |
| 2008/0084806 | A1 | 4/2008 | Ito et al. |
| 2012/0182538 | A1* | 7/2012 | Koole ..................... G03F 1/84 |
| | | | 355/75 |
| 2023/0062418 | A1 | 3/2023 | Chen et al. |

OTHER PUBLICATIONS

Hong et al "Poly(norepinephrine): ultrasmooth material-independent surface chemistry and nanodepot for nitric oxide" Angew. Chem. 2013, 52, 9187.

International Search Report and Written Opinion in International Application No. PCT/US2022/041605 dated Dec. 16, 2022, 9 pages.

Lee et al "Polydopamine and its derivative surface chemistry in material science: a focused review for studies at KAIST" Adv. Mater. 2020, 32, 1907505.

Liu et al "Polydopamine and its derivative materials : synthesis and promising applications in energy , environmental, and biomedical fields" Chem. Rev. 2014, 114, 5057.

Love et al "Self-assembled monolayers of thiolates on metals as a form of nanotechnology" Chem. Rev. 2005, 105, 1103.

Mekhalif et al "Comparative assessment of n-dodecanethiol and n-dodecaneselenol monolayers on electroplated copper" J. Electroanalytical Chem. 2008, 621, 245.

Park et al "Material-selective Polydopamine Coating in Dimethyl Sulfoxide" ACS AMI 2020, 12, 49146.

Zhang et al "Fluorescence decay of quasi monolayered porphyrins near a metal surface separated by short-chain alkanethiols" Appl. Phys. Lett. 2008, 92, 223118.

Korean Intellectual Property Office, International Search Report and Written Opinion for International Application No. PCT/US2023/024636, Sep. 19, 2023, 8 pages.

* cited by examiner

SYSTEM AND METHOD FOR REDUCING SAMPLE NOISE USING SELECTIVE MARKERS

CROSS-REFERENCE TO RELATED APPLICATIONS

The present application claims the benefit under 35 U.S.C. § 119(e) of U.S. Provisional Patent Application Ser. No. 63/352,708, filed Jun. 16, 2022, which is incorporated herein by reference in the entirety.

TECHNICAL FIELD

The present invention generally relates to defect detection, and, more particularly, to a system and method for reducing sample noise using selective markers.

BACKGROUND

As the demand for integrated circuits having ever-small device features continues to increase, the need for improving defect detection mechanisms continues to grow. Current inspection systems rely on principles of passive light scattering for defect signal generation. Defect detection sensitivity may be limited due to process noise of the scattered light and cumulative scattering signals from noise sources across the sample.

Process layer noise may be caused by surface roughness, line edge roughness, and irregular pattern shaping. Current methods to reduce process noise rely on situations where defects or their immediate background have differentiable characteristics from noise sources (e.g., through optical mode selection, design region identification, pattern location differentiation, or image morphology). When defect size decreases, the noise suppression schemes face challenges. For example, when the defect signal strength is close to or below the sample noise level, optical mode optimization to differentiate defects from sample noise becomes infeasible. Further, as defect size decreases, the signal generated from process noises in all regions become on par or sometimes even stronger than that from defects. Further, leveraging design care areas and focusing defect detection at the quietest region becomes ineffective. Further, as noise sources overwhelm the defect signal, algorithm tuning also becomes un-manageable because defect information is lost in the images swamped by sample noise. Further, multi-optic mode optimization also faces challenges when defect signal is on par or weaker than sample noise due to insufficient optical information for selecting suitable optical modes to differentiate defects from wafer noise.

As such, it would be advantageous to provide system and method to remedy the shortcomings of the approaches identified above.

SUMMARY

An inspection is disclosed, in accordance with one or more embodiments of the present disclosure. In embodiments, the inspection system includes an illumination source configured to illuminate a sample positioned on a stage with one or more illumination beams, the sample including a multi-layer stack including a plurality of layers, the plurality of layers formed of a first material and at least a second material, the first material including a light transmissive material, the second material including a light reflective material, a top layer of the plurality of layers within the multi-layer stack including one or more absorptive markers configured to selectively bind to the light transmissive material of the top layer, the one or more absorptive markers configured to absorb the one or more illumination beams from the illumination source to block light transmission through one or more layers positioned below the top layer, the top layer including one or more photoluminescent markers configured to selectively bind to the light reflective material to enhance a feature of interest on the sample. In embodiments, the inspection system includes a set of optical elements configured to direct the one or more illumination beams from the illumination source to a surface of the sample. In embodiments, the inspection system includes one or more detectors configured to detect photoluminescent emission emitted by the one or more photoluminescent markers of the sample, the set of optical elements configured to direct the photoluminescent emission from the one or more photoluminescent markers of the sample to the one or more detectors.

A patterned wafer is disclosed, in accordance with one or more embodiments of the present disclosure. In embodiments, the patterned wafer includes a multi-layer stack, the multi-layer stack including a plurality of layers, the plurality of layers including at least a first layer and one or more additional layers, the first layer positioned on a top surface of the multi-layer stack, the one or more additional layers positioned below the first layer positioned on the top surface of the multi-layer stack. In embodiments, the first layer includes a first material including a light transmissive material. In embodiments, the first layer includes a second material including a light reflective material. In embodiments, the first layer includes one or more absorptive markers configured to selectively bind to the light transmissive material to absorb one or more illumination beams to block light transmission through the one or more additional layers positioned below the first layer positioned on the top surface of the multi-layer stack. In embodiments, the first layer includes one or more photoluminescent markers configured to selectively bind to the light reflective material to enhance a feature of interest. In embodiments, the one or more additional layers include at least the second material including the light reflective material.

A method is disclosed, in accordance with one or more embodiments of the present disclosure. In embodiments, the method includes generating one or more illumination beams using an illumination source. In embodiments, the method includes directing the one or more illumination beams to a sample using a set of optical elements, the sample including a multi-layer stack of a plurality of layers, the plurality of layers formed of at least a first material and at least a second material, the first material including a light transmissive material, the second material including a light reflective material, a top layer of the plurality of layers within the multi-layer stack including one or more absorptive markers configured to selectively bind to the light transmissive material of the top layer, the one or more absorptive markers configured to absorb the one or more illumination beams from the illumination source to block light transmission through one or more layers positioned below the top layer, the top layer including one or more photoluminescent markers configured to selectively bind to the light reflective material to enhance a feature of interest on the sample. In embodiments, the method includes absorbing the one or more illumination beams using the one or more absorptive markers selectively bound to the light transmissive material of the top layer to block light transmission through the one or more layers positioned below the top layer. In embodiments, the method includes detecting photoluminescent emission emitted preferentially from the one or more photoluminescent markers of the sample using one or more detectors.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to a system and method for reducing sample noise using selective markers. More particularly, embodiments of the present disclosure are directed to a system and method for reducing sample noise using one or more light absorptive selective markers. For example, the one or more light absorbing selective markers may be configured to couple to a surface of a light transmissive material of the sample, where absorptive marker is configured retain illumination at the surface of the sample. In this regard, the absorptive marker may be configured to preferentially attach to the light transmissive material of a top surface layer to block light transmission of lower layers positioned below the top surface layer. As such, the light transmission may be controlled such that the noise signal from layers below the top layer of the sample may be minimized by the absorptive marker.

Additionally, embodiments of the present disclosure are directed to a system and method for defect detection using one or more light emitting selective markers. For example, the one or more light emitting selective markers may include a photoluminescent marker configured to selectively attach a light reflective material to preferentially enhance a feature of interest. As such, this preferential amplification may enhance the signal contrast and prevent defect signal degradation.

Figure 1:
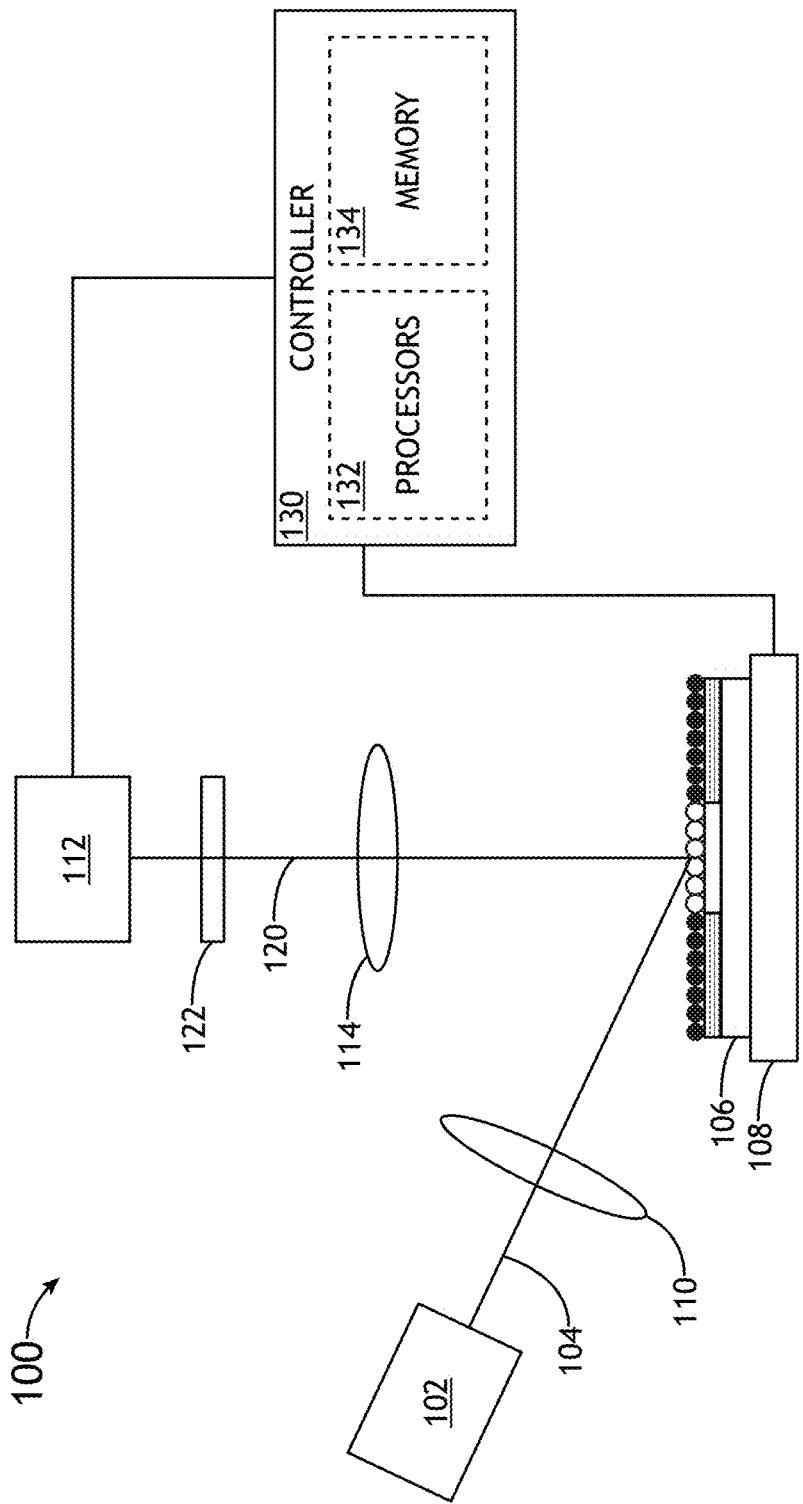
FIG. 1 illustrates a simplified schematic of an inspection system including a photoluminescent patterned sample, in accordance with one or more embodiments of the present disclosure.
Figure 2A:
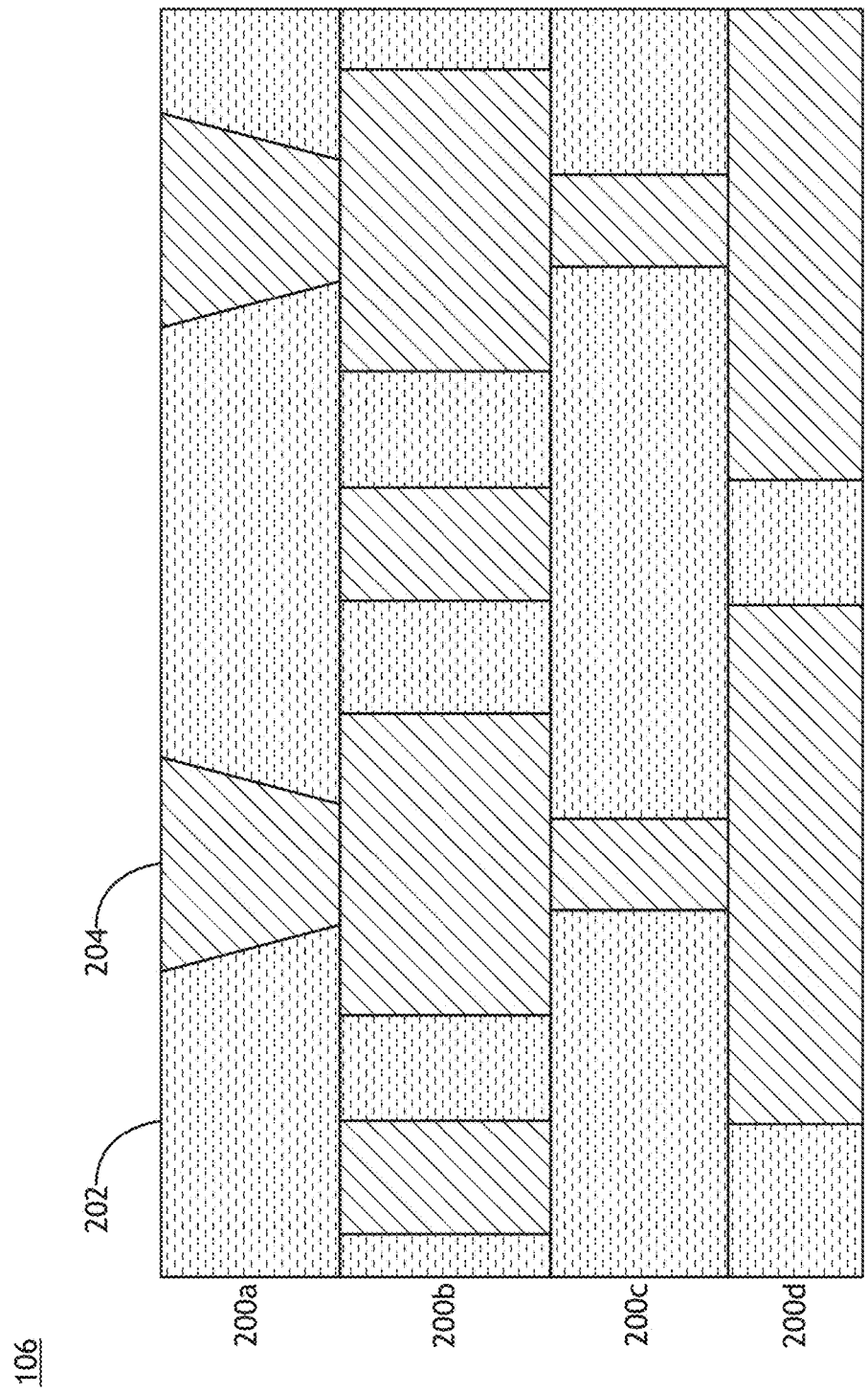
FIG. 2A illustrates a conceptual view of the patterned sample, in accordance with one or more embodiments of the present disclosure.
Figure 2B:
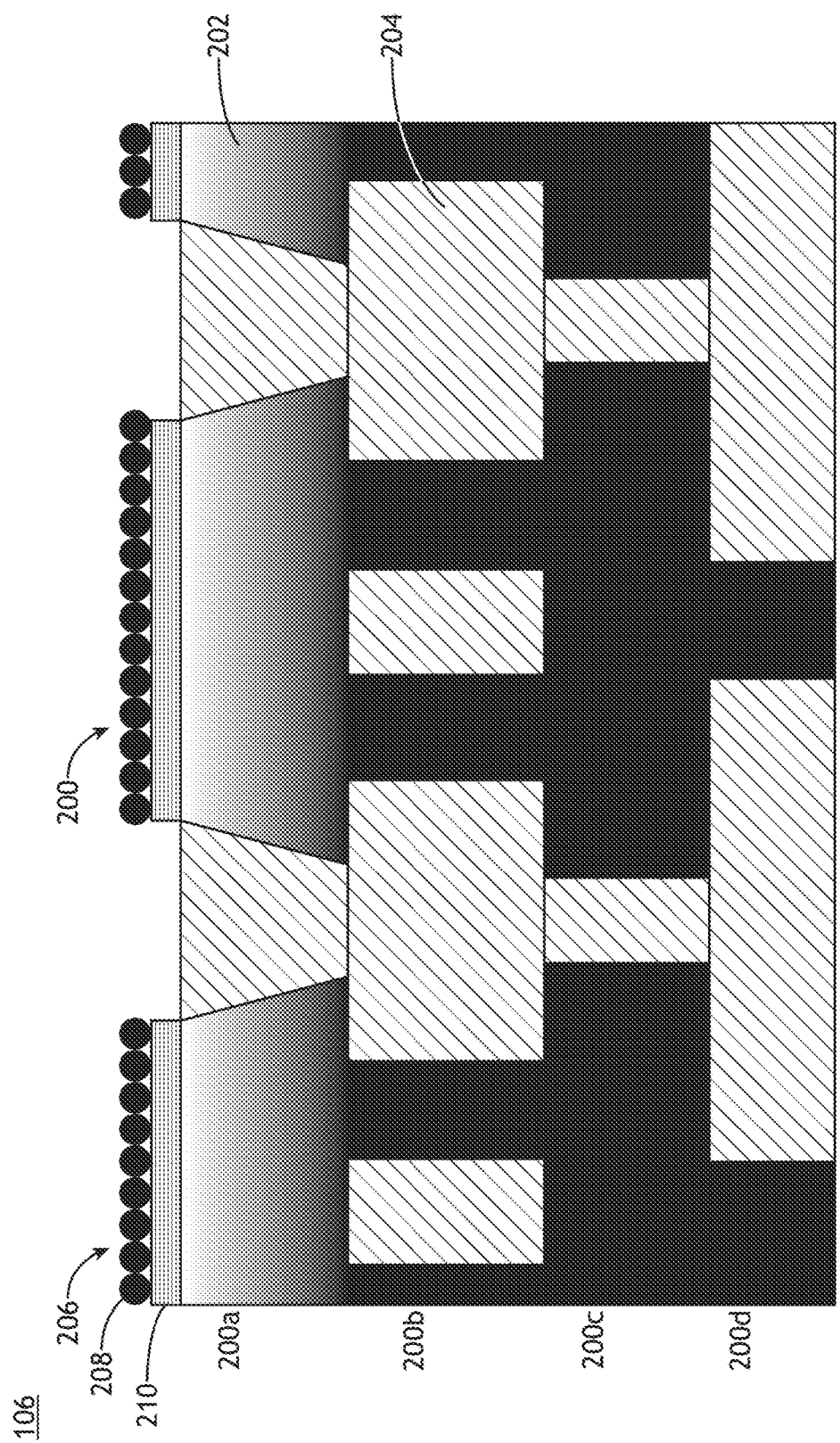
FIG. 2B illustrates a conceptual view of the patterned sample including selectively bound absorptive markers, in accordance with one or more embodiments of the present disclosure.
Figure 2C:
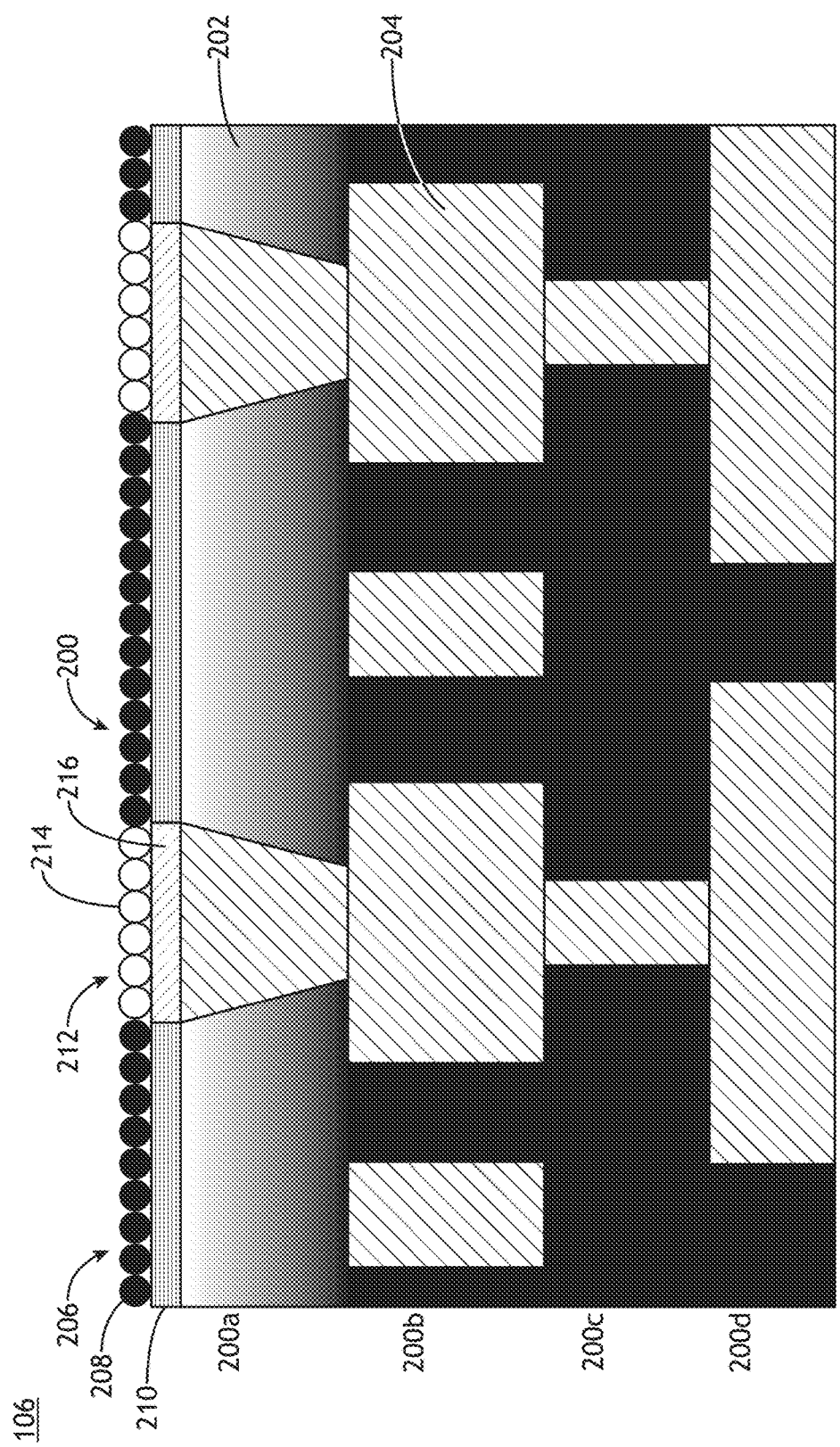
FIG. 2C illustrates a conceptual view of the patterned sample including selectively bound absorptive markers and photoluminescent markers, in accordance with one or more embodiments of the present disclosure.

FIG. 1 is a simplified schematic diagram illustrating an inspection system 100, in accordance with one or more embodiments of the present disclosure. FIGS. 2A-2C are conceptual diagrams illustrating patterned samples 106, in accordance with one or more embodiments of the present disclosure. It is noted herein that the patterned samples 106 illustrated in FIGS. 2A-2C are shown at a high magnification for illustrative purposes.

In embodiments, the system 100 may include an illumination source 102 configured to generate one or more illuminations beams 104. The illumination source 102 may include any type of illumination source.

In embodiments, the illumination source 102 includes one or more narrowband illumination sources. For example, the illumination source 102 may include, but is not limited to, a laser system, including one or more laser sources, configured to generate a laser beam including illumination of a selected wavelength or range or wavelengths. The laser system may be configured to produce any type of laser radiation such as, but not limited to, infrared radiation, visible radiation, and/or ultraviolet (UV) radiation. By way of another example, the illumination source 102 may include, but is not limited to, one or more light emitting diodes (LEDs).

In embodiments, the illumination source 102 includes one or more broadband illumination sources. For example, the illumination source 102 may include, but is not limited to, a broadband lamp configured to generate broadband light of a range of wavelengths (e.g., white light). For instance, the illumination source 102 may include, but is not limited to, a broadband plasma (BBP) light.

In embodiments, the system includes one or more optical elements 110 configured to direct the illumination beam 104 to the sample 106. For example, the one or more optical elements 110 may include one or more spectral filters configured to direct the optimal spectral light to the sample 106. For instance, the one or more spectral filters may be configured to maximize excitation of the photoluminescent material (as discussed further herein).

In embodiments, the one or more optical elements 110 direct the beam 104 to the surface of the sample 106 at a substantially fixed angle of incidence. In another embodiment, the one or more optical elements 110 direct the beam 104 to the surface of the sample 106 at a configurable angle of incidence.

In embodiments, the system 100 includes a stage assembly 108 suitable for securing and positioning the sample 106. The stage assembly 108 may include any sample stage architecture known in the art. For example, the stage assembly 108 may include a linear stage. By way of another example, the stage assembly 108 may include a rotational stage.

It is noted herein that the inspection system 100 may operate in either an imaging mode or a non-imaging mode. In an imaging mode, individual objects (e.g., defects) are resolvable within the illuminated spot on the sample. In a non-imaging mode of operation, all of the light collected by one or more detectors is associated with the illuminated spot on the sample. It is further noted that both imaging and non-imaging modes may be applied within the scope of the present disclosure.

In embodiments, the system 100 includes one or more collection optics 114 configured to collect photoluminescent emission 120 emitted from the sample 106 and direct the photoluminescent emission 120 to one or more detectors 112. It is noted herein that one or more collection optics 114 may be oriented in any position relative to the sample 106. The one or more collection optics 114 may include an objective lens oriented normal to the sample 106. The one or more collection optics 114 may further include a plurality of collection lenses oriented normal to photoluminescent emission 120 from multiple solid angles.

In embodiments, the one or more optical elements 122 are configured to condition the photoluminescent emission 120 prior to detection by the one or more detectors 112. The one or more optical elements 122 may include any elements known in the art suitable for conditioning the photoluminescent emission 120 including, but not limited to, one or more diffractive elements, one or more refractive elements, one or more beam splitters, one or more polarizers, one or more wavelength-selective filters, or one or more neutral density filters.

In embodiments, the one or more optical elements 122 include one or more wavelength-selective filters suitable for passing fluorescent emission corresponding to the emission spectra of one or more photoluminescent materials while blocking wavelengths associated with the illumination beam 104. The one or more optical elements 122 may further separate photoluminescent signal from one or more distinct emission spectra associated with one or more photoluminescent materials such that each distinct emission spectra is directed to a separate detector 112. Further, it is noted herein that the detector 112 may include any optical detector known in the art suitable for measuring light emerging from the sample 106. For example, the detector 112 may include, but is not limited to, a charge-coupled device (CCD) detector, a time-delay integration (TDI) detector, a photomultiplier tube (PMT), an avalanche photodiode (APD), an electron multiplying charge-coupled device (EMCCD), or the like.

It is noted herein that the one or more optical elements 110 and the one or more collection optics 114 may be referred to as a single set of optical elements. It is further noted that the one or more optical elements 110 and the one or more collection optics 114 may share common optical elements. For example, a single objective lens may be configured to both direct illumination to the sample and collect returned light from the sample.

In embodiments, the system 100 includes a controller 130 communicatively coupled to the one or more detectors 112. The controller 130 may include one or more processors 132 configured to execute a set of program instructions maintained in a memory medium 134 (memory 134).

In embodiments, the one or more processors 132 are configured to execute program instructions configured to direct the one or more processors 132 to identify one of more defects on the sample 106 based on the collected photoluminescent emission 120. In embodiments, the controller 130 is further communicatively coupled to the stage assembly 108 to associate photoluminescent emission 120 with specific locations on the sample associated with one or more defects.

Referring to FIGS. 2A-2C, in embodiments, the sample 106 may include a patterned sample 106. For example, the sample 106 may include a substrate 106. The substrate 106 may include a patterned wafer 106. For instance, the sample 106 may include an integrated circuit (IC) device 106.

In embodiments, the patterned sample 106 includes a multi-layer stack formed of a plurality of layers 200a-200d. For example, the patterned sample 106 may include a first layer 200a, a second layer 200b, a third layer 200c, a third layer 200d . . . up to an Nth number of layers. For instance, the patterned sample 106 may include a first layer 200a positioned on a top surface of the sample 106 and one or more additional layers 200b-200d positioned below the first layer 200a positioned on the top surface of the sample 106.

The plurality of layers 200a-200d of the sample 106 may be formed of at least a first material 202 and a second material 204, where the first material 202 is different from the second material 204. Although FIGS. 2A-2C depict the patterned sample 106 being formed of a first material 202 and a second material 204, it is noted that the patterned sample 106 may be formed of any number of materials. For example, the patterned sample 106 may be formed of at least a first material, a second material, a third material . . . up to an Nth number of materials.

In embodiments, at least one of the first material 202 or the second material 204 includes a light transmissive material. For example, as shown in FIGS. 2A-2C, the first material 202 may include a light transmissive material. By way of example, the second material 204 may include a light transmissive material.

The light transmissive material may include, but is not limited to, $SiO_2$, $Si_3N_4$, or the like.

In embodiments, at least one of the first material 202 or the second material 204 includes a light reflective material. For example, as shown in FIGS. 2A-2C, the second material 204 may include a light reflective material. By way of example, the first material 202 may include a light reflective material.

The light reflective material may include, but is not limited to, Si, TiN, or metal material, or the like.

Referring to FIGS. 2A-2C, the sample 106 may include a plurality of intermetal dielectric layers, where each layer 200a-200d may include a portion formed of a dielectric material 202 and a portion formed of a metal material 204. For example, the multi-layer stack may be formed of interlayer dielectric 202 and metal structures 204.

Referring to FIG. 2B, in embodiments, the sample 106 includes one or more absorptive markers 206 configured to selectively bind to one of the first material 202 or the second material 204. For example, the one or more absorptive markers 206 may be configured to selectively bind to the light transmissive material 202. For instance, a top layer (e.g., the first layer 200a) may include the one or more absorptive markers 206 selectively bound to the light transmissive material 202 for the top layer (e.g., the first layer 200a).

In embodiments, the one or more absorptive markers 206 are configured to absorb illumination to block light transmission through the plurality of layers. For example, the light transmissive material 202 of the layers 200a-200d may allow light to travel through respective layers 200a-200d, such that the absorptive markers 206 on the top surface of the sample 106 may be configured to block such transmission. In this regard, the absorptive markers 206 may be configured to block illumination, as shown by the shading in FIG. 2C (e.g., from bright to dark) to depict the strength of the light transmission through the sample 106 (e.g., black being low transmission strength and white being high transmission strength).

In embodiments, the absorptive marker 206 includes a marker molecule 208 and a linker molecule 210. The linker molecule may be configured to enable a preferential material connection between the sample and the marker molecule 208, where the marker molecule 208 may be configured to selectively mark a targeted material to block light transmission.

The one or more absorptive markers 206 may include one or more organic dyes, one or more inorganic dyes, one or more quantum dots, one or more carbon dots, one or more conjugated polymers, or graphene.

Referring to FIG. 2C, in embodiments, the sample 106 includes one or more photoluminescent markers 212 configured to selectively bind to one of the first material 202 or the second material 204 to enhance a feature of interest on the sample 106. For example, the one or more photoluminescent markers 212 may be configured to preferentially attach to a targeted material to enable the targeted material to have enhanced photon emission based on the properties of the photoluminescent markers 212. For instance, the one or more photoluminescent markers 212 may be configured to preferentially attach to the light reflective material 204, such that only the signal from the light reflective material 204 is enhanced.

For purposes of the present disclosure, it is noted that a feature of interest may include, but is not limited to, a defect of interest, a pattern of interest, or a material of interest.

In some embodiments, the photoluminescent marker 212 may be configured to selectively bind at the surface level of one of the first material or the second material. In this regard, the signal from the pattern and defects are substantially enhanced.

The one or more photoluminescent markers 212 may include one or more photoluminescent molecules including, but not limited to, one or more organic dyes (e.g., Cy5, Cy3, rhodamine, or the like), one or more quantum dots (e.g., cadmium telluride (CdTe) dots, cadmium sulfide (CdS) dots, zinc sulfide (ZnS) dots, or the like), one or more carbon dots, one or more transition metals, or one or more conjugated polymers (e.g., polypyrrole, polythiophene, or the like).

In embodiments, the photoluminescent marker 212 may include a marker molecule 214 and a linker molecule 216. The linker molecule 216 may be configured to enable a preferential material connection between the sample and the marker molecule 214, where the marker molecule 214 may be configured to selectively mark a targeted material to enable amplification of a feature of interest signal (e.g., defect of interest, pattern of interest, or material of interest). It is noted herein that the linker molecule may be used to functionally and/or physically separate the photoluminescent molecule from the material of the sample to maximize the efficiency of the photoluminescent properties of the photoluminescent molecule. The length of the linker molecule may be adjusted to balance the physical separation of a luminescent molecule from other molecules that may induce quenching of the photoluminescent output.

A photoluminescent marker (or photoluminescent molecule) in an inspection system 100 may include any type of photoluminescent particle suitable for generating photoluminescence. For example, the one or more photoluminescent tags may include one or more fluorescent tags. For instance, the signal molecule may include one or more hydrophobic fluorophores, one or more hydrophilic fluorophores, and the like. It is noted that the description of fluorescence in the present disclosure is intended to be illustrative rather than limiting and that detection of defects using any type of photoluminescent material is within the scope of the present disclosure.

Selective markers are generally discussed in U.S. Patent Publication No. 2023/0062418, entitled SYSTEM AND METHOD FOR FEATURE SIGNAL ENHANCEMENT USING A SELECTIVELY BONDED PHOTOLUMINESCENT MATERIAL, published on Mar. 2, 2023, which is herein incorporated by reference in the entirety.

Figure 3:
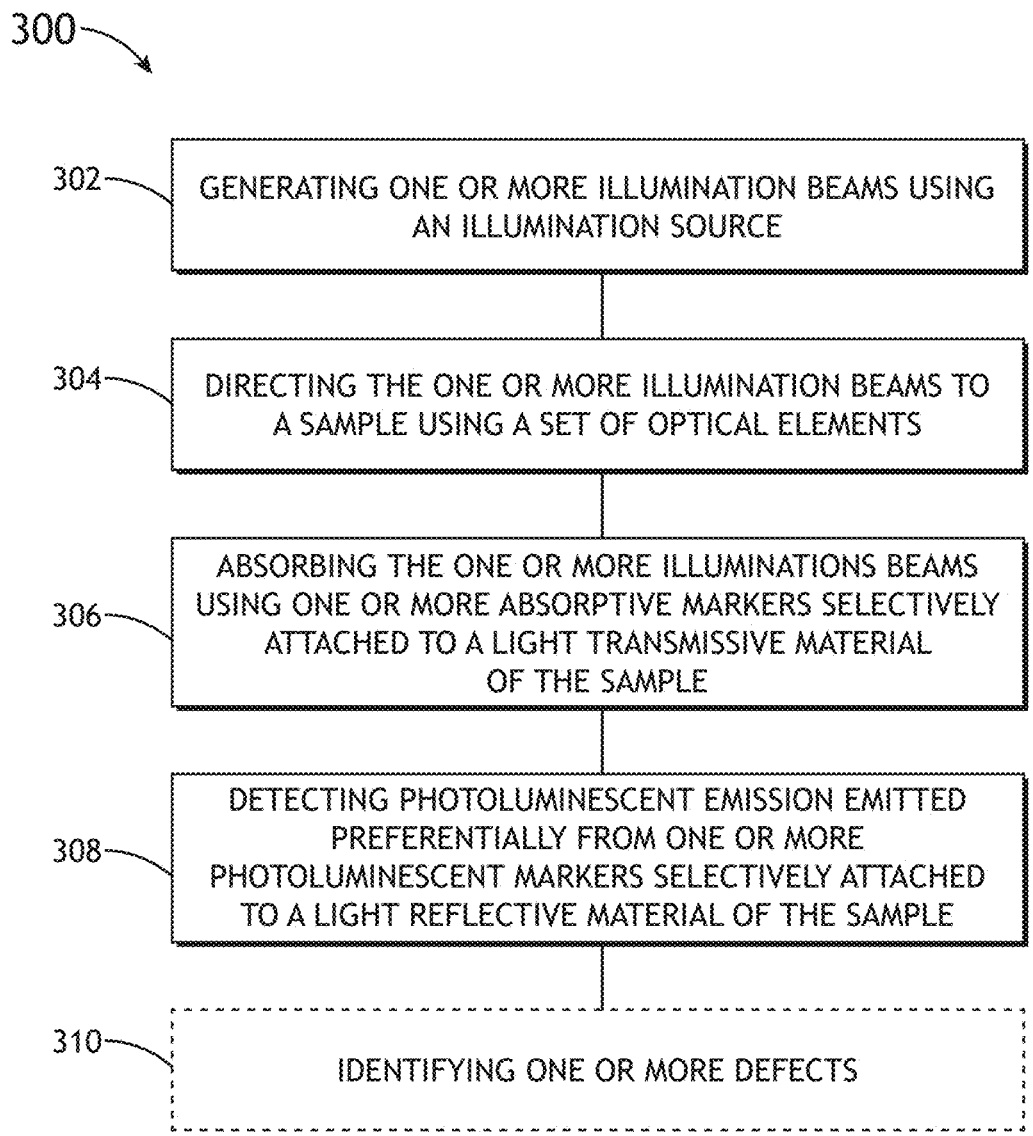
FIG. 3 illustrates a flowchart depicting a method of reducing sample noise, in accordance with one or more embodiments of the present disclosure.

FIG. 3 illustrates a flow diagram depicting a method 300 to reduce noise using the absorptive markers 206 and detect defects using photoluminescent markers 212, where the markers 206, 212 are selectively attached to a target material of the sample, in accordance with one or more embodiments of the present disclosure.

In a step 302, one or more illumination beams may be generated. For example, the illumination source 102 may be configured to generate one or more illumination beams 104. In some embodiments, the illumination source 102 may be configured to excite the photoluminescent marker 212 on the light reflective material 204.

In a step 304, the one or more illumination beams may be directed to the sample. For example, the set of optical elements 110 may be configured to direct the one or more illumination beams 104 to the sample 106. For example, the illumination beams 104 may be directed to the sample 106 to excite the photoluminescent marker 212 on the light reflective material 204. In this regard, photoluminescent light may be emitted by the one or more photoluminescent markers 212 of the light reflective material 204 of the sample 106 in response to the illumination beams 104.

In a step 306, one or more illumination beams may be absorbed using the one or more absorptive markers 206. For example, the one or more absorptive markers 206 selectively bound to the light transmissive material 202 of the first layer 200a (e.g., the top layer 200a) may be configured to absorb illumination. For instance, the one or more absorptive markers 206 may be configured to block light transmission through the one or more layers 200b-200d positioned below the first layer 200a (e.g., the top layer 200a).

As previously discussed herein, the reduction of light in the lower layers (e.g., layers 200b-200d beneath the top layer 200a) results in noise deduction. As such, light transmission into the stack of layers 200a-200d of the sample 106 may be controlled such that signal noise from prior layers are reduced and defect monitoring sensitivity is enhanced.

Figure 4:
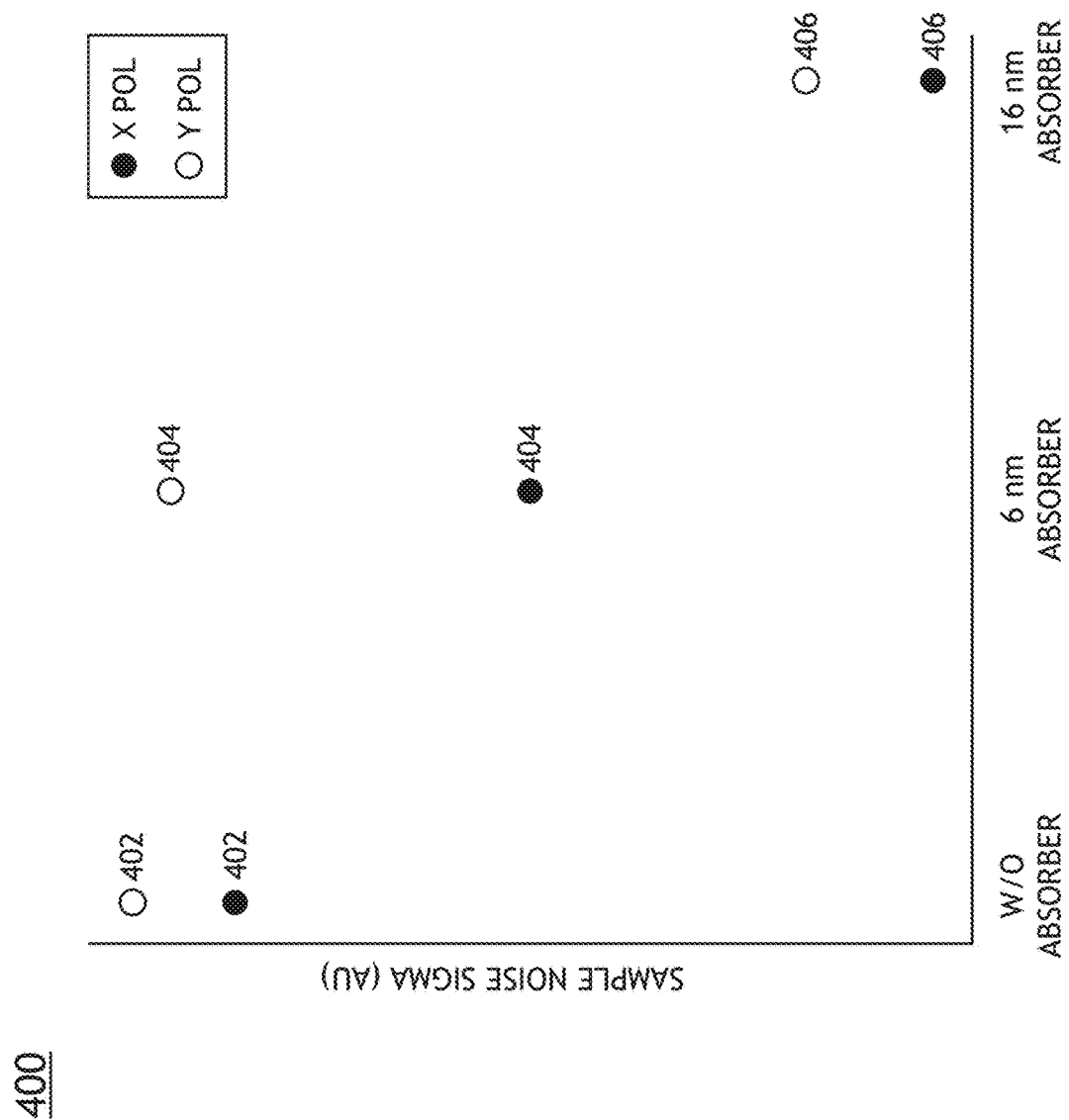
FIG. 4 illustrates a noise signal strength plot, in accordance with one or more embodiments of the present disclosure.

FIG. 4 illustrates a noise signal plot 400, in accordance with one or more embodiments of the present disclosure. The noise signal plot 400 depicts the noise signal strength for x- and y-polarization of a system 402 using no absorptive markers, a system 504 using 6 nm thick absorptive markers, and a system 406 using 16 nm thick absorptive markers. As shown by FIG. 4, the strength of the signal noise is significantly reduced with absorptive selective markers. For example, the system 404 using the 6 nm thick absorptive markers and the system 406 using the 16 nm thick absorptive markers has a lower signal noise than the system 402 using no absorptive markers.

In a step 308, the emitted photoluminescent light may be detected. For example, the one or more detectors 112 may be configured to detect the photoluminescent emission 120 from the photoluminescent markers 212.

In a step 310, one or more defects may be identified based on the detected photoluminescent emission. For example, one or more defects may be identified by generating a defect map of the surface of the sample 106 on which the one or more identified defects are identified.

Although embodiments of the present disclosure are directed to an inspection system, it is contemplated that the patterned wafer with the selective markers (e.g., absorptive markers, photoluminescent markers, and the like) may be used with any characterization system including, but not limited to, an optical metrology system (e.g., image-based metrology system), or the like.

It is further contemplated that each of the embodiments of the method described above may include any other step(s) of any other method(s) described herein. In addition, each of the embodiments of the method described above may be performed by any of the systems described herein.

Referring again to FIG. 1, the one or more processors 132 of the controller 130 may include any processing element known in the art. In this sense, the one or more processors 132 may include any microprocessor-type device configured to execute algorithms and/or instructions. In one embodiment, the one or more processors 132 may consist of a desktop computer, mainframe computer system, workstation, image computer, parallel processor, or any other computer system (e.g., networked computer) configured to execute a program configured to operate the system 100, as described throughout the present disclosure. It is further recognized that the term "processor" may be broadly defined to encompass any device having one or more processing elements, which execute program instructions from a non-transitory memory medium 134. Therefore, the above description should not be interpreted as a limitation on the present invention but merely an illustration.

The memory medium 134 may include any storage medium known in the art suitable for storing program instructions executable by the associated one or more processors 132. By way of a non-limiting example, the memory medium 134 may include a non-transitory memory medium. By way of additional non-limiting examples, the memory medium 134 may include, but is not limited to, a read-only memory, a random access memory, a magnetic or optical memory device (e.g., disk), a magnetic tape, a solid state drive, and the like. It is further noted that memory 134 may be housed in a common controller housing with the one or more processors 132. In an alternative embodiment, the memory 134 may be located remotely with respect to the physical location of the one or more processors 132 and controller 130. For instance, the one or more processors 132 of the controller 130 may access a remote memory (e.g., server), accessible through a network (e.g., internet, intranet, and the like).

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system, the inspection system comprising:
    an illumination source configured to illuminate a sample positioned on a stage with one or more illumination beams, the sample including a multi-layer stack including a plurality of layers, the plurality of layers formed of a first material and at least a second material, the first material including a light transmissive material, the second material including a light reflective material, a top layer of the plurality of layers within the multi-layer stack including one or more absorptive markers configured to selectively bind to the light transmissive material of the top layer, the one or more absorptive markers configured to absorb the one or more illumination beams from the illumination source to block light transmission through one or more layers positioned below the top layer, the top layer including one or more photoluminescent markers configured to selectively bind to the light reflective material to enhance a feature of interest on the sample;
    a set of optical elements configured to direct the one or more illumination beams from the illumination source to a surface of the sample; and
    one or more detectors configured to detect photoluminescent emission emitted by the one or more photoluminescent markers of the sample, the set of optical elements configured to direct the photoluminescent emission from the one or more photoluminescent markers of the sample to the one or more detectors.

2. The inspection system of claim 1, wherein the one or more absorptive markers include at least one of:
    one or more organic dyes, one or more inorganic dyes, one or more quantum dots, one or more carbon dots, one or more conjugated polymers, or graphene.

3. The inspection system of claim 1, wherein the one or more absorptive markers further include a linker molecule.

4. The inspection system of claim 1, wherein the one or more photoluminescent markers includes at least one of:
    one or more organic dyes, one or more quantum dots, one or more carbon dots, one or more transition metals, or one or more conjugated polymers.

5. The inspection system of claim 1, wherein the one or more photoluminescent markers further include a linker molecule.

6. The inspection system of claim 1, further comprising:
    a controller communicatively coupled to the one or more detectors, the controller including one or more processors to execute program instructions causing the one or more processors to identify one or more defects on the surface of the sample based on the detected photoluminescent emission from the one or more detectors.

7. The inspection system of claim 6, wherein the sample includes a substrate.

8. The inspection system of claim 7, wherein the substrate includes a wafer.

9. A patterned wafer, the patterned wafer comprising:
    a multi-layer stack, the multi-layer stack including a plurality of layers, the plurality of layers including at least a first layer and one or more additional layers, the first layer positioned on a top surface of the multi-layer stack, the one or more additional layers positioned below the first layer positioned on the top surface of the multi-layer stack,
    the first layer comprising:
        a first material, wherein the first material includes a light transmissive material;
        a second material, wherein the second material includes a light reflective material;
        one or more absorptive markers configured to selectively bind to the light transmissive material to absorb one or more illumination beams to block light transmission through the one or more additional layers positioned below the first layer positioned on the top surface of the multi-layer stack; and
        one or more photoluminescent markers configured to selectively bind to the light reflective material to enhance a feature of interest,
    the one or more additional layers comprising at least the second material, wherein the second material includes the light reflective material.

10. The patterned wafer of claim 9, wherein the one or more photoluminescent markers preferentially attach to one of the first material or the second material of the patterned wafer.

11. The patterned wafer of claim 9, wherein the one or more absorptive markers include at least one of:
    one or more organic dyes, one or more inorganic dyes, one or more quantum dots, one or more carbon dots, one or more conjugated polymers, or graphene.

12. The patterned wafer of claim 9, wherein the one or more absorptive markers further include a linker molecule.

13. The patterned wafer of claim 9, wherein the one or more photoluminescent markers further include a linker molecule.

14. The patterned wafer of claim 9, wherein the one or more photoluminescent markers include at least one of:
    one or more organic dyes, one or more quantum dots, one or more carbon dots, one or more transition metals, or one or more conjugated polymers.

15. The patterned wafer of claim 9, wherein the patterned wafer includes an integrated circuit device.

16. A method, the method comprising:
    generating one or more illumination beams using an illumination source;
    directing the one or more illumination beams to a sample using a set of optical elements, the sample including a multi-layer stack of a plurality of layers, the plurality of layers formed of at least a first material and at least a second material, the first material including a light transmissive material, the second material including a light reflective material, a top layer of the plurality of layers within the multi-layer stack including one or more absorptive markers configured to selectively bind to the light transmissive material of the top layer, the one or more absorptive markers configured to absorb the one or more illumination beams from the illumination source to block light transmission through one or more layers positioned below the top layer, the top layer including one or more photoluminescent markers configured to selectively bind to the light reflective material to enhance a feature of interest on the sample;

absorbing the one or more illumination beams using the one or more absorptive markers selectively bound to the light transmissive material of the top layer to block light transmission through the one or more layers positioned below the top layer; and detecting photoluminescent emission emitted preferentially from the one or more photoluminescent markers of the sample using one or more detectors.

* * * * *